May 13, 1924.

T. J. THOMPSON

AIR HOSE PROTECTOR

Filed Sept. 19, 1921

1,494,040

2 Sheets-Sheet 1

May 13, 1924.

T. J. THOMPSON

AIR HOSE PROTECTOR

Filed Sept. 19, 1921

1,494,040

2 Sheets-Sheet 2

Inventor:
Thomas J. Thompson,

Patented May 13, 1924.

1,494,040

UNITED STATES PATENT OFFICE.

THOMAS J. THOMPSON, OF CHICAGO, ILLINOIS, ASSIGNOR TO STANDARD OIL COMPANY, OF WHITING, INDIANA, A CORPORATION OF INDIANA.

AIR-HOSE PROTECTOR.

Application filed September 19, 1921. Serial No. 501,719.

*To all whom it may concern:*

Be it known that I, THOMAS J. THOMPSON, a citizen of the United States, residing at 910 South Michigan Avenue, Chicago, in the county of Cook and State of Illinois, have invented a new and useful Improvement in Air-Hose Protectors, of which the following is a specification.

Figure 1:
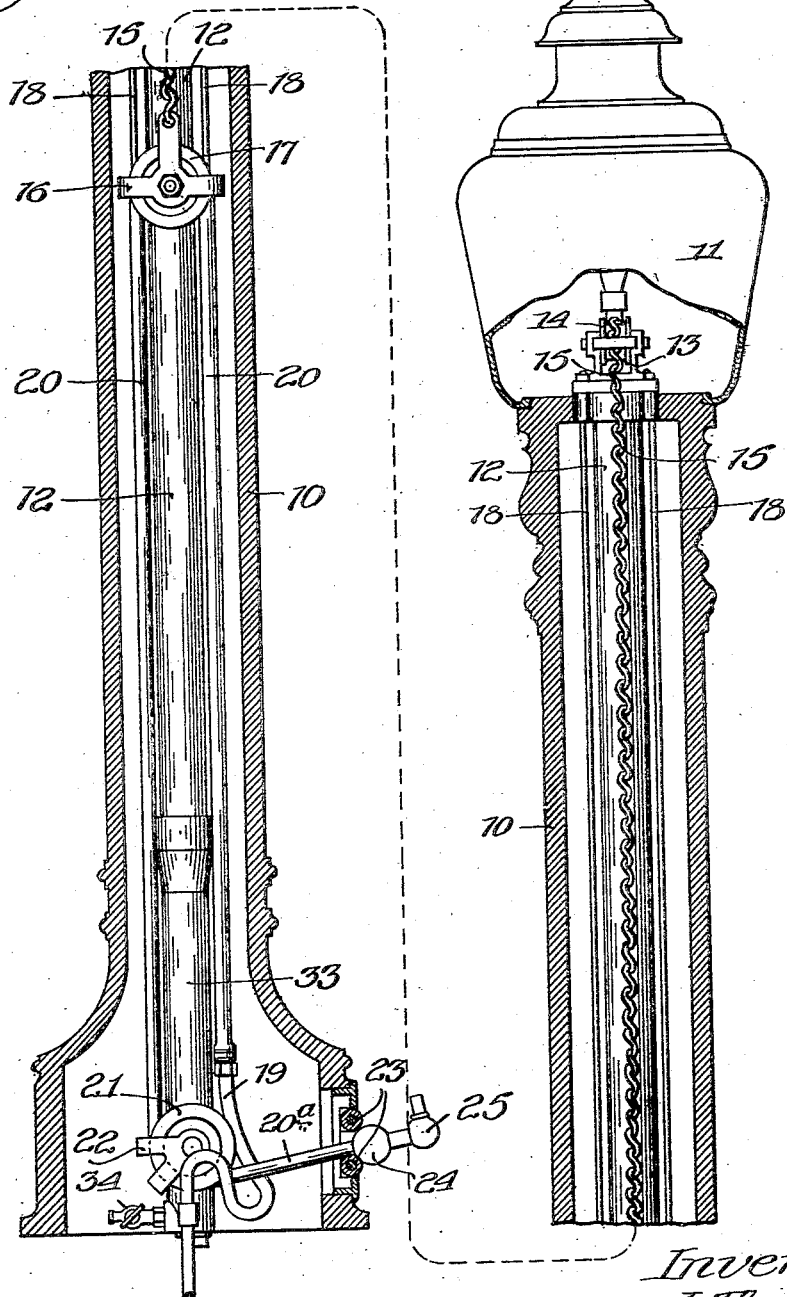
Figure 2:
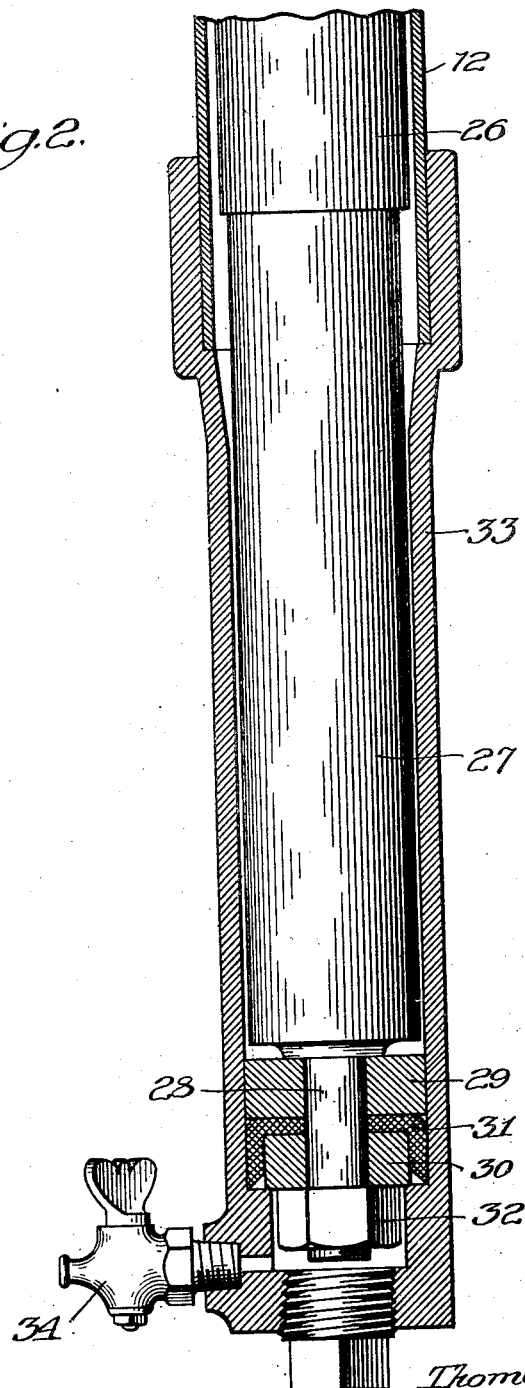

This invention relates to air hose protectors and the like such as are used in connection with air hose for filling automobile tires and is fully described in the following specification and shown in the accompanying drawings, in which:

Figure 1 is a vertical section through an air surface standard embodying the invention and Fig. 2 is an enlarged vertical section through the dash pot at the bottom of the standard.

In the embodiment illustrated the air hose protector is enclosed in a hollow lamp post 10 which is surmounted by a lamp 11. This post may be of any suitable material and has secured therein a tube 12 which carries a bracket 13 at the upper end.

A sheave 14 is journalled in this bracket. A chain or other flexible member 15 passes over the sheave which is located so that one end of the chain passes down the tube 12 while the other hangs outside the tube. The end hanging within the tube is counterweighted as will be later described.

The end of the chain 15 hanging outside the tube is secured to a sheave block 16 in which is journalled a sheave 17. The sheave block 16 is preferably guided upon the vertical guide rods 18.

An air pipe 19 leads to a suitable source of compressed air and terminates in the bottom of the post 10 as shown in Fig. 1. A flexible air hose 20 is secured to the air pipe 19 and passes over the sheave 17 and down around the sheave 21 which is journalled in a sheave block 22 at the bottom of the post. The end of the air hose 20ª passes out through an opening in the side of the post between rollers 23. A rubber ball 24 is placed over the end of the air hose and an air hose coupling 25 of any suitable design is secured to the outer end of the air hose.

The counterweight previously referred to and which is secured to the end of the chain 15 which hangs inside the tube 12 consists of a round iron member 26 approximately filling the tube 12 and terminating in a reduced lower end 27. A bolt 28 extends from the lower end and carries large and small washers 29 and 30 respectively. A leather check valve 31 is held between these two by means of the nut 32.

An air cylinder 33 is secured to the lower end of the tube and is a fairly close fit for the valve 31. The space at the lower end of the cylinder is closed and communicates with the atmosphere through a petcock 34.

The method of operation of this device is as follows:

The operator takes hold of the air coupling 25 and draws the air hose out through the rollers 23 until he is able to reach the tire which he desires to fill. As the air hose is drawn out the sheave block 16 is drawn down raising the counterweight 26. The distance to which the air coupling 25 can be drawn is limited by the height to which the counterweight can be raised.

When the operator has finished filling the tire he releases the coupling 25 when the weight of the counterweight will draw the hose coupling back into the post. As the lower end of the counterweight enters the cylinder 33 the valve 31 will be guided into the cylinder by the tapering upper end thereof. The air caught in the cylinder beneath this valve will be trapped and will flow out slowly through the petcock 34 thereby serving as a dash pot to prevent damage to the apparatus, particularly to the hose 20 which would otherwise be stopped only when the ball 24 landed against the rollers 23.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. An air hose protector comprising a vertical tube, a counterweight loosely slidable therein, a sheave connected to said counterweight, an air hose connected at one end to a source of compressed air supply and passing over said sheave and an air cylinder secured to the lower end of said tube, having its lower end closed and closely fitting said counterweight so as to act as a dash pot, the whole being inclosed within a hollow post, and means for passing said hose through the bottom of the post.

2. An air dispensing device comprising a vertical tube, an air pipe leading to a source of compressed air supply and terminating near said tube, a counterweight loosely slidable in said tube, a sheave at the top of said tube, a flexible member passing over said sheave and attached at one end to said counterweight, the other end of the flexible member carrying a second sheave, an air hose connected to said air pipe and passing over said second sheave, an air cylinder at the bottom of said tube closely fitting said counterweight and having its lower end closed and means for permitting the air to escape from the space in said cylinder beneath said counterweight.

3. An air dispensing device comprising a vertical tube, an air pipe leading to a source of compressed air supply and terminating near said tube, a counterweight loosely slidable in said tube, a sheave at the top of said tube, a flexible member passing over said sheave and attached at one end to said counterweight the other end of the flexible member carrying a second sheave, an air hose connected to said air pipe and passing over said second sheave, an air cylinder at the bottom of said tube closely fitting said counterweight and having its lower end closed and a petcock for permitting the air to escape from the space in said cylinder beneath said counterweight.

THOMAS J. THOMPSON.